United States Patent [19]

Stenkvist

[11] 4,110,546
[45] Aug. 29, 1978

[54] DC ARC FURNACE HAVING A ROTATING ARC

[75] Inventor: Sven-Einar Stenkvist, Vesteras, Sweden

[73] Assignee: ASEA Aktiebolag, Vesteras, Sweden

[21] Appl. No.: 739,048

[22] Filed: Nov. 5, 1976

[30] Foreign Application Priority Data

Nov. 6, 1975 [SE] Sweden .............................. 7512428

[51] Int. Cl.² ............................................. H05B 7/20
[52] U.S. Cl. ...................................................... 13/11
[58] Field of Search ..................... 13/9, 11, 18; 73/341

[56] References Cited

U.S. PATENT DOCUMENTS 1,562,825  11/1925  Evreynoff ................................. 13/11
3,512,413  5/1970   Von Krusenstierna et al. ...... 73/341
3,683,094  8/1972   Schlienger ........................... 13/18 X Primary Examiner—R. N. Envall, Jr.
Attorney, Agent, or Firm—Kenyon & Kenyon, Reilly, Carr & Chapin

[57] ABSTRACT

A DC electric arc furnace with a furnace enclosure having a hearth containing a melt and with an arcing electrode forming an arc with the melt and made to angularly deflect and rotate by magnetic means forming a rotating magnetic field in the enclosure, is provided with means for sensing areas of the enclosure receiving a maximum intensity of arc radiation because of an asymmetrical charge in the furnace, this sensing means controlling the speed of rotation of the arc so that the arc rotates faster while directing its arc flare at these areas receiving maximum radiation.

2 Claims, 3 Drawing Figures

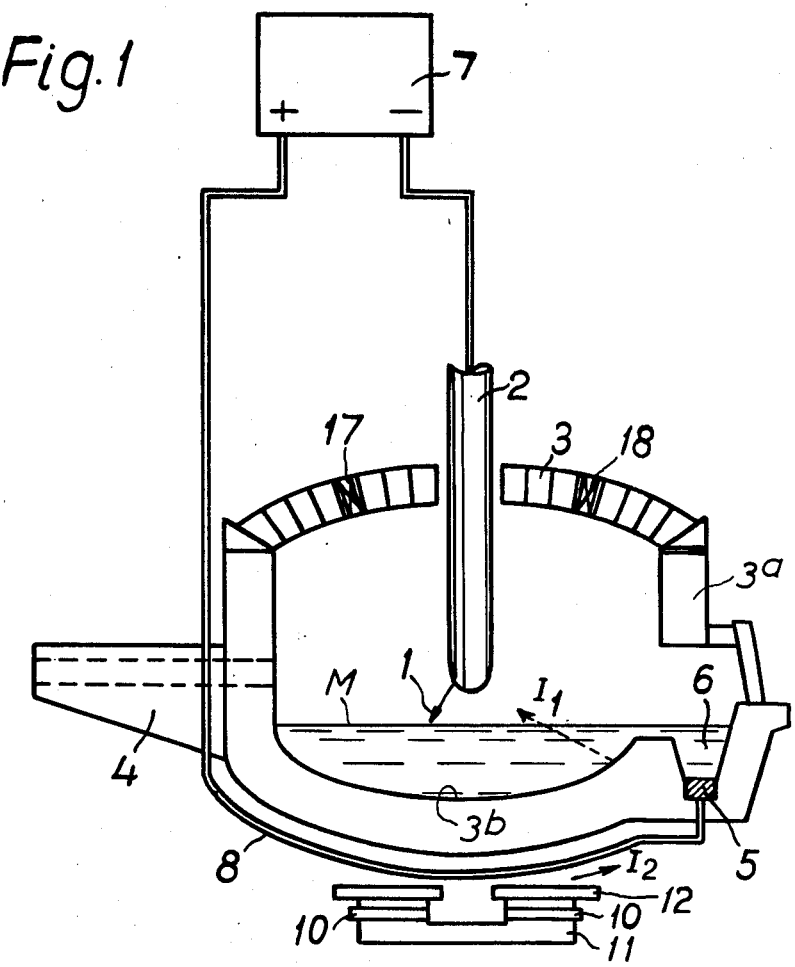
Fig.1
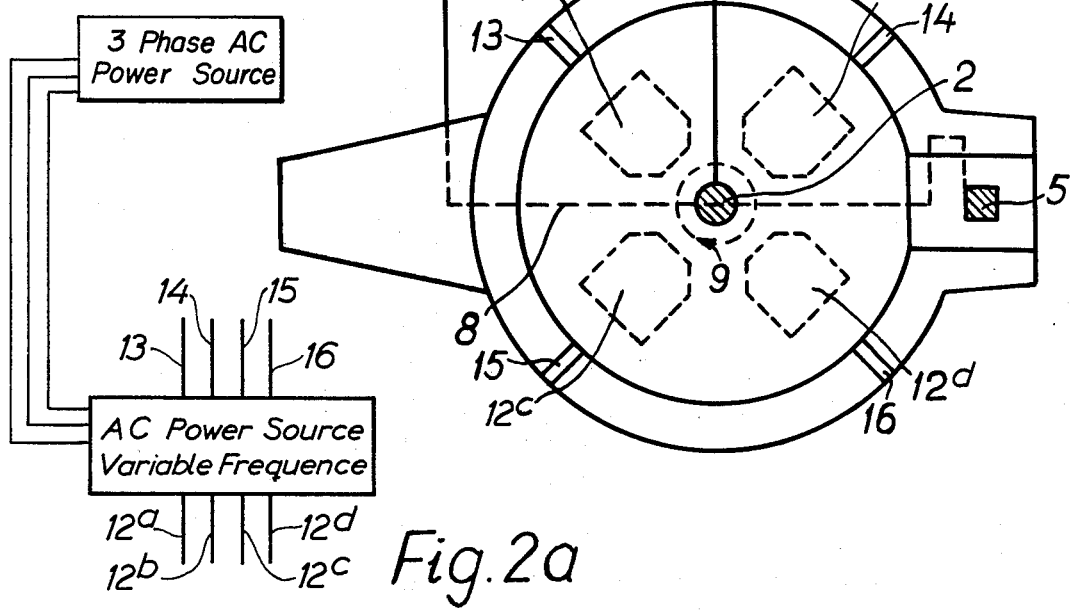
Fig.2
Fig.2a

DC ARC FURNACE HAVING A ROTATING ARC

BACKGROUND OF THE INVENTION

A known DC arc furnace comprises a cylindrical furnace enclosure having a circular hearth for containing a melt, and an arcing electrode centrally positioned in the enclosure above the melt and forming an arc therewith when the electrode and melt are placed in circuit with a source of DC of adequate power. The connections are made so that the melt is anodic and the arcing electrode is cathodic. The melt is obtained by charging the furnace with solid metal pieces such as steel scrap, the charge being melted down to form the melt.

As disclosed by the Valchev et al U.S. Pat. No. 3,835,230, Sept. 10, 1974, the anodic power connection with the melt can be made by a melt contact electrode extending through the hearth and which is laterally offset from the arcing electrode, the electric and magnetic forces involved then causing the arc to deflect angularly in a direction away from the anodic contact electrode. By using more than one contact electrode positioned around the periphery of the hearth, the arc can be made to deflect in different directions by selective connection with one or another of the contact electrodes. With a symmetrical distribution of the contact electrodes and with all of them connected anodically to the DC power source the arc can be vertically directed in alignment with the arcing electrode.

When the arc is operated with an angular deflection relative to the vertical arcing electrode, an arc flare is produced causing radiation to the furnace enclosure wall and thus inducing rapid local erosion of the wall.

The U.S. Stenkvist application Ser. No. 594,739, filed July 10, 1975, now U.S. Pat. No. 4,016,355 Apr. 5, 1977, assigned to the assignee of the present application, discloses that such an electric arc furnace using a melt contact electrode laterally offset from the arcing electrode, can be made to operate with the arc in various angular positions by influencing the arc with a magnetic field created by electromagnets on the outside of the furnace. If the electromagnets, which comprise iron cores and electrically powered coils for the cores, are properly designed and supplied with AC current having a frequency below 25 Hz, the magnetic field influencing the arc can be made to rotate with consequent rotation of the arc at an angularity with respect to the arcing electrode. In other words, the arc can be made to rotatively sweep through a downwardly flaring conical path.

In all of these arrangements with the arcing electrode positioned on the axis of the symmetrical furnace enclosure and hearth, it would seem that uniform unconcentrated erosion of the furnace enclosure's wall can be obtained. A vertical arc should radiate symmetrically outwardly in all directions. An angularly deflected arc forming an arc flare involving concentrated radiation against the furnace enclosure wall should also provide uniform wall wear if made to rotate uniformly using a low frequency AC to power the electromagnetic coil or coils providing the arc directional control.

However, it has been found that even under the above circumstances from the start of the melt-down of the solid pieces charged to the end of the melt finishing the arc radiation does not have a uniform wearing or eroding action on the furnace wall.

SUMMARY OF THE INVENTION

The present inventor has found that when the described type of electric furnace is charged with solid metal pieces, such as steel scrap, for the melt-down phase, that the charge is seldom if ever symmetrically charged around the arcing electrode which is centrally located within the cylindrical furnace enclosure. Therefore, during this melt-down period portions of the furnace wall are shielded from the arc radiation or flare by higher piles of material while portions are exposed by lower portions of material so that the more exposed wall portions receive a greater amount of arc radiation than other portions which are shielded by higher piles of scrap. He has found that such an uneven melt-down action is unfavorable both with regard to the wear on the furnace wall and the rate the melt-down proceeds.

With the above in mind, the present invention comprises a DC electric arc furnace with a furnace enclosure having a hearth for containing a melt, both being generally cylindrical or circular in cross section. An arcing electrode is positioned centrally in the enclosure above the melt to form an arc with the melt when the electrode and melt are placed in circuit with a source of DC. Magnetic means are provided for forming a rotating magnetic field in the enclosure causing the arc to deflect angularly and to rotate.

With the above arrangement means are provided for varying the rotative speed of the arc with the rotative speed responsive to the enclosure's temperature at one or a plurality of locations interspaced around the enclosure's periphery. The arrangement is such that the rotative speed of the deflected arc is relatively fast when the arc is deflected towards relatively hot portions of the enclosure and the speed is relatively slow while the arc deflects towards relatively cold portions of the enclosure during each complete rotation of the arc.

In other words, when the arc deflection causes a directed radiation which rotates past a high pile of material, the rotative speed of the arc slows down, thus putting more heat into the high pile of solid metal being melted down and which is shielding the furnace wall against the arc radiation. When during its rotation the arc deflects towards a lower pile of material, the rotative speed of the arc is increased so that the furnace wall no longer shielded by a high pile of material, receives the arc radiation or arc flare for a relatively short period of time. The arc flare radiation is used more effectively for the melt-down and is not wasted by destructive radiation against the furnace wall.

BRIEF DESCRIPTION OF THE DRAWINGS

An example of the present invention is illustrated schematically by the accompanying drawings, in which:

FIG. 1 is a vertical section,

FIG. 2 is a horizontal section, of a DC arc furnace of the type described and embodying the principles of the present invention, and FIG. 2a shows the control arrangement for varying the arc rotative speed.

DETAILED DESCRIPTION OF THE INVENTION

Having reference to the above drawings, an angularly deflected arc is indicated by the arrow 1 formed at the tip of a vertical arcing electrode 2 passed through an opening in the furnace enclosure roof 3, the furnace having the usual pouring spout 4 at one side and at the opposite side and laterally offset from the arcing electrode 2 having a melt contact electrode 5 positioned in an electrode pocket 6 formed in the vertical furnace wall 3a and which receives a portion of the melt M in the hearth 3b of the furnace enclosure.

As shown by FIG. 2, the furnace wall 3a and its hearth 3b are circular in cross section with the arcing electrode 2 centrally positioned. The arc angularity indicated by the arrow 1 is inherently obtained when the DC arc power is connected so that the melt contact electrode 5 is anodic and the arcing electrode 2 is cathodic. On the other hand, the arc can be made to follow a truly vertical path aligned with the arcing electrode 2 if the direct current source 7 carries the positive current to the melt contact electrode 5 by a conductor 8 extending under the bottom of the furnace from a position diametrically opposite to this electrode 5, as disclosed by the Stenkvist application Ser. No. 647,215 filed Jan. 7, 1976, now U.S. Pat. No. 4,038,483, July 26, 1977, and also assigned to the assignee of the present application.

The previously referred to electromagnet is positioned below the hearth 3b, which is of non-magnetic construction, and is shown as being a three, four or other multi-pole magnetizing winding or windings or coils 10 and an iron core 11 forming in this instance four symmetrically disposed pole pieces 12 below the furnace bottom, as indicated by FIG. 2. By supplying this electromagnet arrangement with two-phase low frequency alternating current, such as at a frequency below 25 Hz and preferably from 0.01 to 10 Hz, the arc can by the magnetic forces produced be made to not only deflect as indicated by the arrow 1, but also to follow a circular sweeping path as indicated at 9 in FIG. 2. If the electromagnet has three poles for example, a three-phase AC supply can be used.

As shown by FIG. 2, four temperature measuring devices 13, 14, 15 and 16 are uniformly distributed around the vertical wall of the furnace enclosure and at a level most apt to receive arc radiation of the greatest intensity. These devices may be as disclosed by the Krusenstierna et al U.S. Pat. No. 3,512,413, May 19, 1970, the disclosure of this patent being hereby incorporated into the present application. Similar devices can also or alternatively be placed in the furnace roof 3 as indicated at 17 and 18 in FIG. 1. It is possible to use only one of the devices but normally a multiplicity would be used.

In any case each of the devices provides a signal which as schematically indicated by FIG. 2a, is fed to the source of the AC power feed to the various coils of the various pole pieces 12a, 12b 12c and 12d shown in FIG. 2, so as to vary the frequency applied to these coils within the low frequency range previously mentioned. Low frequency AC supply means of controllable variable frequency are commercially available and which operate both rotatively and statically.

FIG. 1 illustrates the melt produced by a prior melt-down. However, at the start of the melt-down solid metal pieces are charged in the hearth 3b to inherently form piles of varying height. With the coils of the coil pieces unenergized, the conductor 8 orients the arc vertically. When the various coils of the electromagnet are energized with low frequency AC, the arc deflection 1 again becomes angular as shown in FIG. 1 while at the same time rotatively sweeping through the circle 9 shown by FIG. 2.

The arrangement is such that if, for example, in FIG. 2 the sensor 13 provides a signal indicating low temperature, its signal controls the AC power source to reduce the frequency so that the rotative speed of the arc slows down. If then, for example, the sensor 14 provides a high temperature reading, the AC power source adjusts to a higher frequency under the control of that sensor 14 so that the arc flare sweeps by this portion of the furnace enclosure wall more rapidly.

Four to eight or more of the sensors or transducers are normally required, distributed around the circumference of the furnace wall 3a at a suitable height above the slag line so that any tendency to uneven melt-down or furnace wall temperature is detected quickly.

It is to be understood that the slowing or speeding of rotation is effected during each complete rotation of the arc sweep pattern. The frequencies used for rotative speed control should preferably be between 0.01 to 10 Hz. As a starting value, 0.25 Hz could be used which might then be changed to 0.5 Hz in the region where the rotative sweep is to be accelerated. It is also possible to use as a starting frequency one that is reduced in the regions where the sensors detect lower temperatures.

What is claimed is:

1. A DC electric arc furnace comprising a furnace enclosure having a hearth for containing a melt, an arcing electrode positioned in the enclosure above the melt and forming an arc therewith when the electrode and melt are placed in circuit with a source of DC, magnetic means for forming a rotating magnetic field in the enclosure causing the arc to rotatively deflect, and means for varying the rotative speed of said arc while the arc rotates through any one complete rotation so as to cause said speed to be relatively fast when said arc is deflected towards relatively hot portions of said enclosure and said speed to be relatively slow when said arc is deflected towards relatively cold portions of the enclosure.

2. The furnace of claim 1 having means for causing said rotative speed to be responsive to the enclosure's temperature at at least one location of the enclosure's periphery.

* * * * *